(12) United States Patent
Takahashi et al.

(10) Patent No.: US 6,882,445 B1
(45) Date of Patent: Apr. 19, 2005

(54) COLOR GAMUT COMPRESSION APPARATUS AND METHOD

(75) Inventors: Mariko Takahashi, Tokyo (JP); Tsuneo Sato, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/480,338

(22) Filed: Jan. 7, 2000

(30) Foreign Application Priority Data

May 31, 1999 (JP) .......................................... 11-151021
Jun. 14, 1999 (JP) .......................................... 11-166607

(51) Int. Cl.$^7$ ................................................ H04N 1/60
(52) U.S. Cl. ........................ 358/1.9; 358/518; 382/167
(58) Field of Search ................................ 358/518–520, 358/1.9; 382/167, 232, 243

(56) References Cited

U.S. PATENT DOCUMENTS

| | | | | |
|---|---|---|---|---|
| 5,363,218 A | * | 11/1994 | Hoshino | 358/518 |
| 5,742,296 A | * | 4/1998 | Yamada et al. | 345/604 |
| 5,875,260 A | * | 2/1999 | Ohta | 382/162 |
| 6,388,674 B1 | * | 5/2002 | Ito et al. | 345/590 |
| 6,560,356 B1 | * | 5/2003 | Takahashi et al. | 382/162 |

OTHER PUBLICATIONS

Shin Dong Kim et al, SPIE, vol. 3300, pp. 129–136.

Robert Y.C. Wei et al, TAGA Proc (Tech Assoc Graphic Arts) 1997, pp. 685–702.

* cited by examiner

*Primary Examiner*—Scott A. Rogers
(74) *Attorney, Agent, or Firm*—Birch, Stewart, Kolasch & Birch, LLP

(57) ABSTRACT

A color gamut compression apparatus for converting a source color generated by an information-input apparatus into a target color inside a color gamut reproducible by an information-output apparatus. The color gamut compression apparatus computes a point of compression such that the point of compression lies on a substantially straight line connecting a point of convergence and a source color, and lies inside the color gamut of the information-output apparatus.

40 Claims, 10 Drawing Sheets

- ● COLOR OUTSIDE COLOR GAMUT
- ○ POINT OF COMPRESSION
- ■ POINT OF CONVERGENCE

- ● COLOR OUTSIDE COLOR GAMUT
- ○ POINT OF COMPRESSION
- ■ POINT OF CONVERGENCE

COLOR GAMUT COMPRESSION APPARATUS AND METHOD

BACKGROUND OF THE INVENTION

The present invention generally relates to color gamut compression apparatuses and methods for converting a source color expressed by an information-input apparatus into a target color in a color gamut reproducible by an information-output apparatus and, more particularly, to a color gamut compression apparatus and method in which, when the information-input-apparatus and the information-output apparatus differ with respect to the color gamut, a first color outside the color gamut of the information-output apparatus is converted into a second color inside the color gamut of the information-output apparatus such that an original image is reproduced with as high fidelity as possible and high-brightness color and low-brightness color are converted into colors of sufficiently high chroma while maintaining high color consistency in the direction of brightness.

Information apparatuses such as displays, printers and scanners which process color image data have a range of color which may be input or output which is characteristic to the information apparatus. That is to say, such apparatuses have a color gamut. Color image signals may be transferred between information apparatuses of different types of color gamut for processing such that a color in the information-input apparatus is reproducible in the information-output apparatus provided that the color gamut of the information-output apparatus such as displays and printers includes the color gamut of the information-input apparatus such as scanners. If the color gamut of the information-output apparatus does not include the color gamut of the information-input apparatus, however, those colors that are inside the color gamut of the information-input apparatus but outside the color gamut of the information-output apparatus are not reproduced without undergoing a change in the information-output apparatus.

Thus, a color which is outside the color gamut of the information-output apparatus is output after conversion into a color inside a color gamut of the information-output apparatus. That is to say, when the color gamut of an information-output apparatus is not coextensive with the color gamut of an information-input apparatus, color gamut compression for converting a source color in the input-information apparatus into a target color inside the color gamut of the information-output apparatus is required.

One approach to the conventional color gamut compression method is disclosed in the copending PCT/JP98/01785 application yet to be published at the time of filing of the present invention. FIG. 8 illustrates a concept behind the related-art color gamut compression described in PCT/JP98/01785. More specifically, FIG. 8 shows color compression in a CIE/L*a*b* space, where L* indicates brightness and C indicates chroma. That is, a color along the L* axis is an achromatic color.

According to the related-art color gamut compression method of FIG. 8, a point of convergence is provided on the achromatic L* axis. A source color outside the color gamut of the information-output apparatus is converted into a target color on a point of intersection between a boundary of the color gamut of the information-output apparatus and a half line passing through the source color and ending at the point of convergence. Such a color gamut compression method is known to provide superior color consistency and ease of computation due to the fact that the point of convergence lies on the L* axis.

It is to be noted that, with respect to hue, there is discrepancy between the color space and the characteristic of human visual system. For example, areas of Cyan (hereinafter, indicated by C), Blue (hereinafter, indicated by B), Magenta (hereinafter, indicated by M), Red (hereinafter, indicated by R), Yellow (hereinafter, indicated by Y) and Green (hereinafter, indicated by G) with transition into one another in the stated order in the generally employed CLE/L*a*b* color space are characterized such that the hue areas of C and B are warped. For this reason, the related-art color gamut compression causes the area of B to intrude the area of C or M. The reproducible area of B is enlarged and those of C and M are reduced such that a color with a digital representation in the area of C or M is output as a color that contains a blue component, causing hue shift when the output color is observed.

Due to the discrepancy between the color space and the characteristic of human visual system, compression performed within the same hue may cause an image before compression to be visually different from an image after compression. Since the related-art color gamut compression using the CIE/L*a*b* color space compresses within the same hue, it is difficult to ensure satisfactorily high visual consistency with respect to hue.

Another disadvantage with the related-art color gamut compression is that, since the point of convergence lies on the achromatic L* axis, high-brightness colors and low-brightness colors tend to be compressed toward a color with low chroma, producing a relatively low-chroma image when observed.

SUMMARY OF THE INVENTION

Accordingly, a general object of the present invention is to provide a color gamut compression apparatus and method in which the aforementioned disadvantages are eliminated.

Another and more specific object is to provide a color gamut compression apparatus and method capable of compression producing a target color which is visually matched with a source color with a high fidelity with respect to hue, and which undergoes no deterioration in color consistency.

Still another object is to provide a color gamut compression apparatus and method in which colors in the high-brightness zone and low-brightness zone are compressed to a color of a satisfactorily high chroma without deteriorating color gradation.

In order to achieve the aforementioned objects, the present invention provides a color gamut compression apparatus for converting a source color generated by an information-input apparatus into a target color inside a color gamut reproducible by an information-output apparatus, comprising: a point of convergence computation part for computing a point of convergence for a chromatic color such that the point of convergence has the same hue value as a hypothetical chromatic color that would be reproduced by the information-output apparatus based on a digital signal value for the information-input apparatus corresponding to a color determined by the source color, and such that the point of convergence lies inside the color gamut of the information-output apparatus; a first point of compression computation part for computing a point of compression such that the point of compression lies on a substantially straight line connecting the point of convergence and the source color, and lies inside the color gamut of the information-output apparatus; and a compression part for converting the source color into the target color corresponding to the point of compression computed by the first point of compression computation part.

The first point of compression computation part may compute the point of compression such that the point of compression is at an intersection of the substantially straight line and a boundary of the color gamut of information-output apparatus.

The color gamut compression apparatus may further comprise: a point of convergence computation execution determination part for determining whether the source is a chromatic color or an achromatic color; a second point of compression computation part for computing, when the point of convergence computation execution determination part determines that the source color is an achromatic color, the point of compression such that the point of compression lies inside the color gamut of the information-output apparatus and has zero chroma; and the compression part may convert the source color into a color corresponding to the point of compression computed by the second point of compression computation part.

When a hue value of the source color matches that of any of a predetermined number of representative colors of the information-input apparatus, the point of convergence computation part may compute the point of convergence such that the point of convergence has the same hue value as a hypothetical color reproduced by the information-output apparatus based on a digital signal value corresponding to the matched representative color, and such that the point of convergence lies inside the color gamut of the information-output apparatus and is achromatic; and, when the source color is intermediate adjacent representative colors with respect to hue, the point of convergence may be computed by linear interpolation of points of convergence corresponding to the adjacent representative colors.

When the hue of the source color lies within a hue range including transitions from the representative color Green to the representative colors Cyan, Blue and Magenta, the point of convergence computation part may compute the point of convergence such that the point of convergence has the same hue value as a hypothetical color reproduced by the information-output apparatus based on a digital signal value corresponding to the representative color Blue, and such that the point of convergence lies inside the color gamut of the information-output apparatus and is chromatic.

When the hue of the source color lies within a hue range including a transition from the representative color Red to the representative color Yellow, the point of convergence computation part may compute the point of convergence such that the point of convergence has the same hue value as a hypothetical color reproduced by the information-output apparatus based on a digital signal value corresponding to the representative color Cyan, lies inside the color gamut of the information-output apparatus and is chromatic.

When the hue of the source color lies within a hue range including a transition from the representative color Magenta to the representative color Red, the point of convergence computation part may compute a first point of convergence such that the first point of convergence has the same hue value as a hypothetical color reproduced by the information-output apparatus based on a digital signal value corresponding to the representative color Blue, and such that the first point of convergence lies inside the color gamut of the information-output apparatus and is chromatic, and the point of convergence computation part may compute a second point of convergence such that the second point of convergence has the same hue value as a hypothetical color reproduced by the information-output apparatus based on a digital signal value corresponding to the representative color Cyan, lies inside the color gamut of the information-output apparatus and is chromatic. The point of convergence may be determined by linear interpolation on a hue scale on a line segment between the first point of convergence and the second point of convergence.

When the hue of the source color lies within a hue range including a transition from the representative color Yellow to the representative color Green, the point of convergence computation part may compute a first point of convergence such that the first point of convergence has the same hue value as a hypothetical color reproduced by the information-output apparatus based on a digital signal value corresponding to the representative color Blue, lies inside the color gamut of the information-output apparatus and is chromatic, and the point of convergence computation part may compute a second point of convergence such that the second point of convergence has the same hue value as a hypothetical color reproduced by the information-output apparatus based on a digital signal value corresponding to the representative color Cyan, lies inside the color gamut of the information-output apparatus and is chromatic; and the point of convergence may be determined by linear interpolation on a hue scale on a line segment between the first point of convergence and the second point of convergence.

The point of convergence computation part may compute the point of convergence such that the point of convergence has the same brightness level as one of four values for the hue value which is determined by the source color, the four values being maximum chroma, mean value of the color gamut, gravitational center value of the color gamut and median of the color gamut.

The point of convergence computation part may compute the point of convergence such that the point of convergence has a hue value $C_n$ satisfying an equation (1) below $$C_n = K_c \times C_{max} \quad (1)$$

where $C_{max}$ indicates one of maximum chroma reproducible by the information-output apparatus for the hue determined by the source color, maximum chroma at the mean value of the color gamut, maximum chroma at the gravitational center value of the color gamut, and maximum chroma at the median of the color gamut, and $k_c$ ($0 < k_c < 1$) indicates an arbitrary parameter.

The point of convergence computation part may compute an optional point of computation such that the optional point of convergence lies between two intersections formed by a line having the same hue value and same chroma as the aforementioned point of convergence and parallel with a brightness axis and by a boundary of the color gamut of the information-output apparatus, and is determined in accordance with a chroma value of the source color.

The point of compression computation part may compute an optional point of convergence such that the optional point of convergence lies between the aforementioned point of convergence and an achromatic point having the same hue value and same brightness level as the aforementioned point of convergence, and is determined in accordance with a chroma value of the source color.

The point of convergence computation part may compare a chroma value of the source color with a predetermined chroma value a, and, if the chroma value is equal to or greater than a, the aforementioned point of convergence may be used, and, if the chroma value is smaller than a, the point of convergence computation part may compute an optional point of convergence such that the optional point of convergence lies between the aforementioned point of convergence and an achromatic point having the same hue value and same brightness level as the aforementioned point of convergence, and is determined by the chroma value of the source color.

The aforementioned objects can also be achieved by a color gamut compression method for converting a source color generated by an information-input apparatus into a target color inside a color gamut reproducible by an information-output apparatus, comprising the steps of: computing a point of convergence for a chromatic color such that the point of convergence has the same hue value as a hypothetical chromatic color that would be reproduced by the information-output apparatus based on a digital signal value for the information-input apparatus corresponding to a color determined by the source color, and lies inside the color gamut of the information-output apparatus; computing a point of compression such that the point of compression lies on a substantially straight line connecting the point of convergence and the source color, and lies inside the color gamut of the information-output apparatus; and converting the source color into the target color corresponding to the point of compression computed according to the step of computing the first point of compression.

The color gamut compression method may further comprising the steps of: determining whether the source is a chromatic color or an achromatic color: computing, when the source color is determined to be an achromatic color, the point of compression such that the point of compression lies inside the color gamut of the information-output apparatus and has zero chroma; and the source color may be converted into a color corresponding to the point of compression thus computed.

When a hue value of the source color matches that of any of a predetermined number of representative colors of the information-input apparatus, the step of computing the point of convergence may compute the point of convergence such that the point of convergence has the same hue value as a hypothetical color reproduced by the information-output apparatus based on a digital signal value corresponding to the matched representative color, lies inside the color gamut of the information-output apparatus and is achromatic; and, when the source color is intermediate adjacent representative colors with respect to hue, the point of convergence may be computed by linear interpolation of points of convergence corresponding to the adjacent representative colors.

When the hue of the source color lies within a hue range including transitions from the representative color Green to the representative colors Cyan, Blue and Magenta, the step of computing the point of convergence may compute the point of convergence such that the point of convergence has the same hue value as a hypothetical color reproduced by the information-output apparatus based on a digital signal value corresponding to the representative color Blue, lies inside the color gamut of the information-output apparatus and is chromatic.

When the hue of the source color lies within a hue range including a transition from the representative color Red to the representative color Yellow, the step of computing the point of convergence may compute the point of convergence such that the point of convergence has the same hue value as a hypothetical color reproduced by the information-output apparatus based on a digital signal value corresponding to the representative color Cyan, lies inside the color gamut of the information-output apparatus and is chromatic.

When the hue of the source color lies within a hue range including a transition from the representative color Magenta to the representative color Red, the step of computing the point of convergence may compute a first point of convergence such that the first point of convergence has the same hue value as a hypothetical color reproduced by the information-output apparatus based on a digital signal value corresponding to the representative color Blue, lies inside the color gamut of the information-output apparatus and is chromatic, and the step of computing the point of convergence may compute a second point of convergence such that the second point of convergence has the same hue value as a hypothetical color reproduced by the information-output apparatus based on a digital signal value corresponding to the representative color Cyan, lies inside the color gamut of the information-output apparatus and is chromatic; and the point of convergence may be determined by linear interpolation on a hue scale on a line segment between the first point of convergence and the second point of convergence.

When the hue of the source color lies within a hue range including a transition from the representative color Yellow to the representative color Green, the step of computing the point of convergence may compute a first point of convergence such that the first point of convergence has the same hue value as a hypothetical color reproduced by the information-output apparatus based on a digital signal value corresponding to the representative color Blue, lies inside the color gamut of the information-output apparatus and is chromatic; the step of computing the point of convergence may compute a second point of convergence such that the second point of convergence has the same hue value as a hypothetical color reproduced by the information-output apparatus based on a digital signal value corresponding to the representative color Cyan, lies inside the color gamut of the information-output apparatus and is chromatic; and the point of convergence may be determined by linear interpolation on a hue scale on a line segment between the first point of convergence and the second point of convergence.

The aforementioned objects can also be achieved by a color gamut compression apparatus for converting a source color generated by an information-input apparatus into a target color inside a color gamut reproducible by an information-output apparatus, comprising: a point of convergence computation part for computing a point of convergence for a chromatic color such that the point of convergence has the same hue value as the source color, has the same brightness as one of a maximum chroma color, a mean value of the color gamut reproducible by the information-output apparatus, gravitational center value of the color gamut reproducible by the information-output apparatus, and median of the color gamut reproducible by the information-output apparatus, and lies inside the color gamut of the information-output apparatus; a first point of compression computation part for computing a point of compression such that the point of compression lies on a substantially straight line connecting the point of convergence and the source color, and lies inside the color gamut of the information-output apparatus; and a compression part for converting the source color into the target color corresponding to the point of compression computed by the first point of compression computation part.

The first point of compression computation part may compute the point of compression such that the point of compression is at an intersection of the substantially straight line and a boundary of the color gamut of information-output apparatus.

When a hue value of the source color matches that of any of a predetermined number of representative colors of the information-input apparatus, the point of convergence computation part may compute the point of convergence for a chromatic color such that the point of convergence has the same hue value as the source color, has the same brightness as one of a maximum chroma color, a mean value of the color gamut reproducible by the information-output apparatus, gravitational center value of the color gamut reproducible by the information-output apparatus, and median of the color gamut reproducible by the information-output apparatus, and lies inside the color gamut of the information-output apparatus; and wherein, when the source color is intermediate adjacent representative colors with respect to hue, the point of convergence may be computed by linear interpolation of points of convergence corresponding to the adjacent representative colors.

The color gamut compression apparatus may further comprise: a point of convergence computation execution determination part for determining whether the source is a chromatic color or an achromatic color; a second point of compression computation part for computing, when the point of convergence computation execution determination part determines that the source color is an achromatic color, the point of compression such that the point of compression lies inside the color gamut of the information-output apparatus and has zero chroma; and the compression part may convert the source color into a color corresponding to the point of compression computed by the second point of compression computation part.

The point of convergence computation part may compute the point of convergence such that the point of convergence has a hue value $C_n$ satisfying an equation (1) below $$C_n = K_c \times C_{max} \tag{1}$$

where $C_{max}$ indicates one of maximum chroma reproducible by the information-output apparatus for the hue value of the source color, maximum chroma at the mean value of the color gamut for the hue value of the source color, maximum chroma at the gravitational center value of the color gamut for the hue value of the source color, and maximum chroma at the median of the color gamut for the hue value of the source color, and $k_c$ ($0 < k_c < 1$) indicates an arbitrary parameter.

The point of convergence computation part may compute an optional point of computation such that the optional point of convergence lies between two intersections formed by a line having the same hue value and same chroma as the aforementioned point of convergence and parallel with a brightness axis and by a boundary of the color gamut of the information-output apparatus, and is determined in accordance with a chroma value of the source color.

The point of compression computation part may compute an optional point of convergence such that the optional point of convergence lies between the aforementioned point of convergence and an achromatic point having the same hue value and same brightness level as the aforementioned point of convergence, and is determined in accordance with a chroma value of the source color.

The point of convergence computation part may compare a chroma value of the source color with a predetermined chroma value a, and, if the chroma value is equal to or greater than a, the aforementioned point of convergence may be used, and, if the chroma value is smaller than a, the point of convergence computation part may compute an optional point of convergence such that the optional point of convergence lies between the aforementioned point of convergence and an achromatic point having the same hue value and same brightness level as the point of convergence determined according to claim 1, and is determined by the chroma value of the source color.

The aforementioned objects can also be achieved by a color gamut compression method for converting a source color generated by an information-Input apparatus into a target color inside a color gamut reproducible by an information-output apparatus, comprising the steps of: computing a point of convergence for a chromatic color such that the point of convergence has the same hue value as the source color, has the same brightness as one of a maximum chroma color, a mean value of the color gamut reproducible by the information-output apparatus, gravitational center value of the color gamut reproducible by the information-output apparatus, and median of the color gamut reproducible by the information-output apparatus, and lies inside the color gamut of the information-output apparatus; computing a point of compression such that the point of compression lies on a substantially straight line connecting the point of convergence and the source color, and lies inside the color gamut of the information-output apparatus; and converting the source color into the target color corresponding to the point of compression computed by the first point of compression computation part.

The step of computing the first point of compression may compute the point of compression such that the point of compression is at an intersection of the substantially straight line and a boundary of the color gamut of information-output apparatus.

When a hue value of the source color matches that of any of a predetermined number of representative colors of the information-input apparatus, the step of computing the point of convergence may compute the point of convergence for a chromatic color such that the point of convergence has the same hue value as the source color, has the same brightness as one of a maximum chroma color, a mean value of the color gamut reproducible by the information-output apparatus, gravitational center value of the color gamut reproducible by the information-output apparatus, and median of the color gamut reproducible by the information-output apparatus, and lies inside the color gamut of the information-output apparatus; and, when the source color is intermediate adjacent representative colors with respect to hue, the point of convergence may be computed by linear interpolation of points of convergence corresponding to the adjacent representative colors.

The color gamut compression method may further comprise the steps of: determining whether the source is a chromatic color or an achromatic color; computing, when the source color is determined to be an achromatic color, the point of compression such that the point of compression lies inside the color gamut of the information-output apparatus and has zero chroma; and the source color may be converted into a color corresponding to the point of compression thus computed.

The step of computing the point of convergence may compute the point of convergence such that the point of convergence has a hue value $C_n$ satisfying an equation (1) below $$C_n = K_c \times C_{max} \tag{1}$$

where $C_{max}$ indicates one of maximum chroma reproducible by the information-output apparatus for the hue value of the source color, maximum chroma at the mean value of the color gamut for the hue value of the source color, maximum chroma at the gravitational center value of the color gamut for the hue value of the source color, and maximum chroma at the median of the color gamut for the hue value of the source color, and $k_c$ ($0 < k_c < 1$) indicates an arbitrary parameter.

The step of computing the point of convergence may compute an optional point of computation such that the optional point of convergence lies between two intersections formed by a line having the same hue value and same chroma as the aforementioned point of convergence and parallel with a brightness axis and by a boundary of the color gamut of the information-output apparatus, and is determined in accordance with a chroma value of the source color.

The point of compression computation part computes an optional point of convergence such that the optional point of convergence lies between the aforementioned point of convergence and an achromatic point having the same hue value and same brightness level as the aforementioned point of convergence, and is determined in accordance with a chroma value of the source color.

The point of convergence computation part may compare a chroma value of the source color with a predetermined chroma value a, and, if the chroma value is equal to or greater than a, the aforementioned point of convergence may be used, and, if the chroma value is smaller than a, the point of convergence computation part computes an optional point of convergence such that the optional point of convergence lies between the aforementioned point of convergence and an achromatic point having the same hue value and same brightness level as the aforementioned point of convergence, and is determined by the chroma value of the source color.

BRIEF DESCRIPTION OF THE DRAWINGS

Other objects and further features of the present invention will be apparent from the following detailed description when read in conjunction with the accompanying drawings, in which.

DETAILED DESCRIPTION OF THE PREFERRED EMBODIMENTS

Embodiment 1

Figure 1:
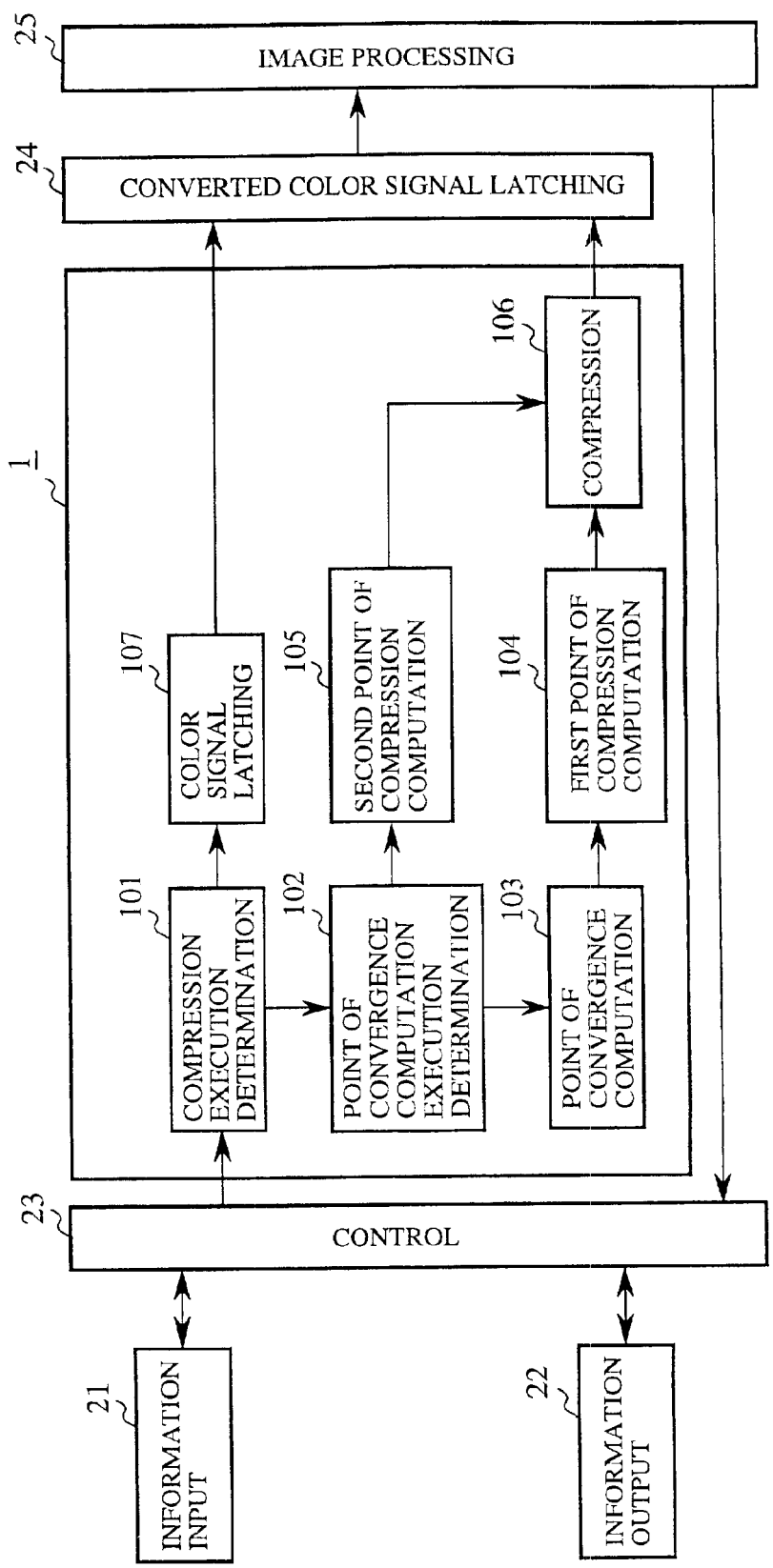
FIG. 1 shows a color gamut compression apparatus according to a first embodiment of the present invention.

FIG. 1 show a color gamut compression apparatus according to the first embodiment. FIG. 1 shows a color gamut compression apparatus according to a preferred embodiment, comprises a color gamut compression part 1 supplied with a color image signal form an information-input apparatus 21 such as a monitor via a controller 23, converting a source color, provided by the color image signal, outside the color gamut of an information-output apparatus 22 such a s printer and display into a target color inside the color gamut of an information-output apparatus 22, and outputting the target color to a converted color signal latching part 24. The color image signal includes information related to brightness, chroma and hue subject to vector operation in the CIE/L*a*b color space.

The color gamut compression apparatus also comprises a color gamut compression execution determination part 101 for determining whether a color gamut compression process is to be performed for the color image signal from the controller 23, outputting the color image signal to a point of convergence computation execution determination part 102 when the color gamut compression process is to be performed, and outputting the color image signal to a color signal latching part 107 when the color gamut compression process is not to be performed. More specifically, a determination is made as to whether the source color provided by the color image signal from the controller 23 is located inside the color gamut of the information-output apparatus 22. When the source color is not inside the color gamut of the information-output apparatus 22, a determination is made that the color gamut compression process is to be performed. When the source color is inside the color gamut of the information-output apparatus 22, a determination is made that the color gamut compression process is not to be performed.

The color gamut compression apparatus further comprises a point of convergence computation execution determination part 102 for determining whether a point of convergence computation process is to be performed for the color image signal from the color gamut compression execution determination part 101, outputting the color image signal to a point of convergence computation part 103 when the point of convergence computation process is to be performed, and outputting the color image signal to a second point of compression computation part 105 when the point of convergence computation process is not to be performed. More specifically, a determination is made as to whether the source color provided by the color image signal from the color gamut compression execution determination part 101 is a chromatic color or an achromatic color. When the source color is a chromatic color, a determination is made that the point of convergence computation process is to be performed. When the source color is an achromatic color, a determination is made that the point of convergence computation process is not to be performed.

The color gamut compression apparatus further comprises a point of convergence computation part 103 for computing a chromatic point of convergence for a source color provided by the color image signal from the point of convergence computation execution determination part 102; that is, the source color provided by the information-input apparatus 21. The point of convergence is computed such that it has the same hue value as a hypothetical color that would be reproduced by the information-output apparatus based on an input (21) digital signal value for a color determined by the source color, and lies inside the color gamut of the information-output apparatus 22. The point of convergence and the color image signal are output from the point of convergence computation part 103 to a first point of compression computation part 104.

If a hue value of the source color provided by the color image signal from the point of convergence computation execution determination part 102 matches that of one of representative colors of the information-input apparatus 21, the point of convergence is computed such that it has the same hue value as a hypothetical color that would be reproduced by the information-output apparatus 22 based on an input (21) digital signal value of the source color, has the same brightness as a maximum chroma color reproducible by the information-output apparatus 22, lies inside the color gamut of the information-output apparatus 22, and is chromatic. If the hue value of the source color provided by the color image signal from the point of convergence computation execution determination part 102 does not match that of any of the representative colors of the information-input apparatus 21, that is, if the source color provided by the color image signal is intermediate adjacent representative colors with respect to hue, the point of convergence is computed by linear interpolation of points of convergence corresponding to the adjacent representative colors.

A representative color is defined as a color of maximum chroma. For example, the RGB digital signals R(255, 0, 0), G(0, 255, 0), B(0, 0, 255), C(0, 255, 255), M(255, 0, 255) and Y(255, 255, 0) indicate representative colors. If the source color provided by the color image signal of the information-input apparatus 21 lies between representative colors such as R and G on the hue scale, the point of convergence is computed by linear interpolation of points of convergence corresponding to representative colors adjacent to the source color on the hue scale such that the points of convergence are contiguous with each other. Although a digital signal value is device-independent, a given digital signal may result in different target colors because different apparatuses have different characteristics with respect to basic colors that provide a basis for color reproduction.

The color gamut compression apparatus further comprises a first point of compression computation part 104 for computing, based on the point of convergence and the color image signal from the point of convergence computation part 103, a coordinate of a point of compression such that the point of compression lies on a substantially straight line connecting the point of convergence and the source color provided by the color image signal and lies inside the color gamut of the information-output apparatus 22. More specifically, the first point of compression computation part 104 computes the coordinate at a point of intersection between the substantially straight line and the boundary of the color gamut of the information-output apparatus 22. The substantially straight line could be slightly warped or could contain an error due to approximation.

The color gamut compression apparatus further comprises a second point of compression computation part 105 for computing, based on the color image signal from the point of convergence computation execution determination part 102, a coordinate of a point of compression such that the point of compression lies inside the color gamut of the information-output apparatus 22 and has 0 chroma. More specifically, the second point of compression computation part 105 computes a point for an achromatic color inside the color gamut of the information-output apparatus 22 and closest to the source color provided by the color image signal.

The color gamut compression apparatus further comprises a compression part 106 for converting the coordinate of the point of compression computed by the first point of compression computation part 104 or the point of compression computed by the second point of compression computation part 105 into a corresponding color image signal; and a signal latching part 107 for latching the color image signal from the compression execution determination part 101.

The color gamut compression part 1 may use a lookup table (LUT). A lookup table is a search table tabulating correspondence between the RGB space and the L*a*b* color space. By providing the relation between the RGB space and the L*a*b* color space in the form of a table instead of a relational expression, the processing rate can be increased. Use of a table lacks accuracy since the values listed therein derive from approximation. However, in the present invention, it is considered that approximation suffices. For example, when a pair of colors have a substantially identical hue value, they are deemed to have an identical hue value; when they have a substantially identical brightness level, they are deemed to have an identical brightness level; and when they have a substantially identical chroma level, they are deemed to have an identical chroma level.

Referring again to FIG. 1, a converted color image signal retaining part 24 is coupled to the color gamut compression part 1 so as to retain the color image signal therefrom. An image processing part 25 is coupled to the converted color image signal retaining part 24 so as to subject the color image signal therefrom to a predetermined image process such as an edge process before outputting the processed color image signal to the controller 23. The information-output apparatus 22 may be a printer or the like for visualizing the color image signal from the controller 23. The controller 23 is adapted for transferring of the color image signal between the information-input apparatus 21 and the information-output apparatus 22.

A description will now be given of the operation of the color gamut compression apparatus according to the first embodiment. It is assumed that the color space in which the color gamut compression takes place is a CIE/L*a*b* color space.

When the color image signal is supplied from the information-input apparatus 21 to the controller 23, the controller 23 forwards the color image signal to the color gamut compression execution determination part 101 of the color gamut compression part 1.

The compression execution determination part 101 determines whether the color gamut compression is to be performed by determining whether the source color provided by the color image signal from the controller 23 is inside the color gamut of the information-output apparatus 22 for the hue. If the source color does not lie inside the color gamut of the information-output apparatus 22, it is determined that the color gamut compression is to be performed so that the color image signal is output to the point of convergence computation execution determination part 102. The point of convergence computation execution determination part 102 determines whether the point of convergence computation is to be performed based on whether the source color provided by the color image signal from the color gamut compression execution determination part 101 is a chromatic color or an achromatic color. If the source color is a chromatic color, it is determined that the point of convergence computation is to be performed so that the color image signal is output to the point of convergence computation part 103.

Figure 2:
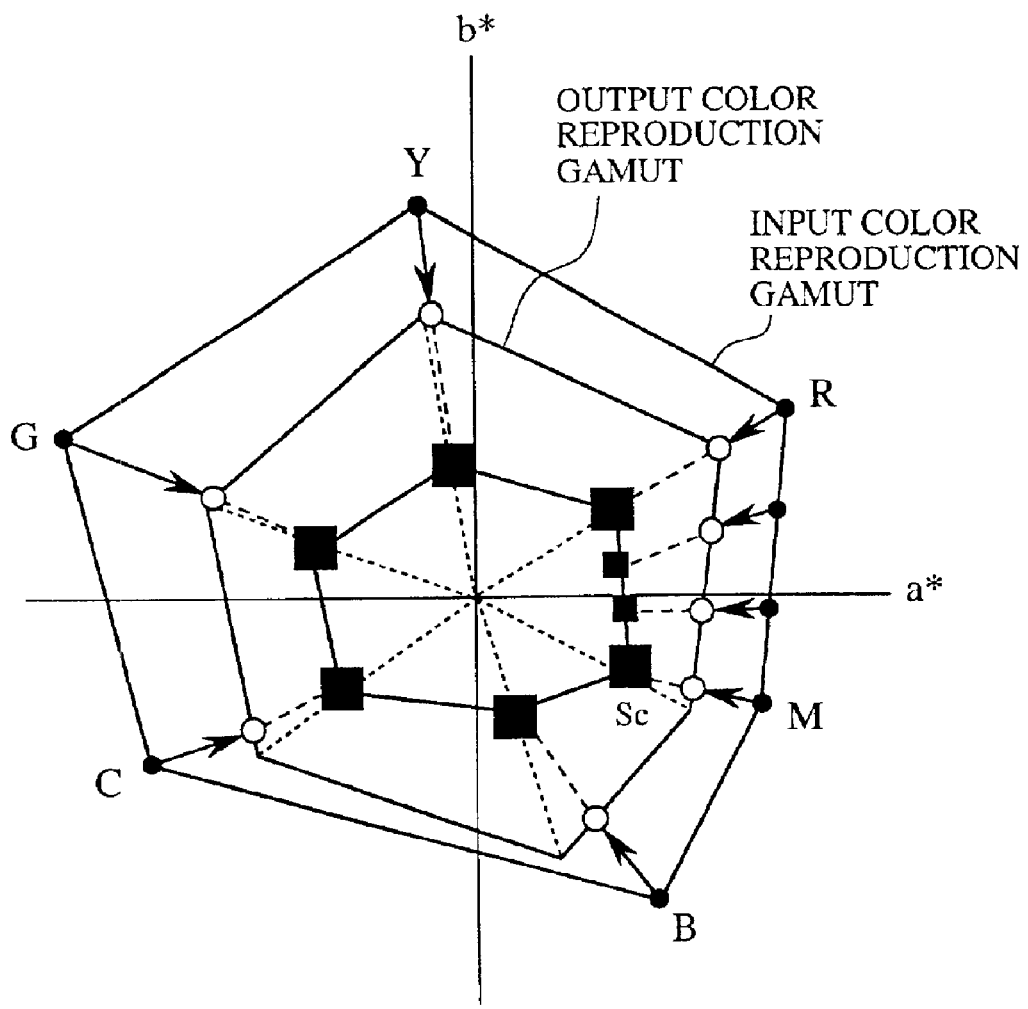
FIG. 2 is a chart illustrating color gamut compression according to the first embodiment.

FIG. 2 is a chart illustrating color gamut compression according to the first embodiment. The point of convergence computation part 103 determines whether the source color provided by the color image signal from the point of convergence computation execution determination part 102 has the same hue value as one of the representative colors of the information-input apparatus 21. If the source color is determined to have the hue of one of the representative colors, the point of convergence $S_c$ is determined such that it has the same hue value as a hypothetical chromatic color that would be reproduced by the information-output apparatus 22 based on a digital signal value for a color corresponding to the source color, has the same brightness as the maximum chroma color reproducible by the information-output apparatus 22, lies inside the color gamut of the information-output apparatus 22, and is chromatic. The point of convergence and the color image signal are output to the first point of compression computation part 104.

If the source color does not have the same hue value as any of the representative colors of the information-input apparatus 21, the coordinate of the point of convergence $S_c$ is computed by linear interpolation of points of convergence corresponding to representative colors adjacent to the source color on the hue scale such that the points of convergence are contiguous to each another. For example, linear interpolation is exercised between a line segment connecting the representative color M and the representative color R of the information-input apparatus 21, and a line segment connecting points of convergence in the information-output apparatus 22 for the representative colors M and R. The point of convergence $S_c$ thus computed and the color image signal is output to the first point of compression computation part 104.

The first point of compression computation part 104 computes the coordinate of a point of compression based on the point of convergence and the color image signal from the point of convergence computation part 103 such that the point of compression is a point of intersection between a substantially straight line connecting the point of convergence and the point corresponding to the source color, and the boundary of the color gamut of the information-output apparatus 22. The first point of compression computation part 104 outputs the coordinate thus computed to the compression part 106.

The compression part 106 converts the coordinate of the point of compression computed by the first point of compression computation part 104 into a corresponding color image signal and outputs the signal to the converted color signal latching part 24.

If the source color provided by the color image signal from the color gamut compression execution determination part 101 is an achromatic color, the point of convergence computation execution determination part 102 determines that the point of convergence is not to be computed and outputs the color image signal to the second point of compression computation part 105. The second point of compression computation part 105 computes the coordinate of an achromatic point of compression based on the color image signal from the point of convergence computation execution determination part 102 such that the point of compression lies inside the color gamut of the information-output apparatus 22 and closest to the source color. The second point of compression computation part 105 outputs the coordinate thus computed to the compression part 106.

The compression part 106 converts the coordinate computed by the second point of compression computation part 106 into a corresponding color image signal and outputs the signal to the converted color signal latching part 24.

When it is determined that the source color lies inside the color gamut of the information-output apparatus 22, the color gamut compression execution determination part 101 determines that the color gamut compression is not to be performed and forwards the color image signal to the color signal latching part 107. The color image signal latching part 107 latches the color image signal before outputting the same to the converted color image signal latching part 24.

The converted color image signal latching part 24 supplies the color image signal latched therein to the image processing part 25 wherein the color image signal is subject to an edge process or the like before being output to the controller 23. The controller 23 supplies the color image signal to the information-output apparatus 22 so that the information-output apparatus 22 visualizes the color image signal.

According to the first embodiment, by compressing the source color provided by the color image signal from the information-input apparatus to the target color corresponding to the point of compression determined as described above, precision of visual matching is prevented from being reduced due to hue shift after compression. Moreover, by configuring the point of convergence to be a chromatic color, colors at the high-brightness zone and low-brightness zone can be compressed to a color of high chroma, resulting in color gamut compression producing a target color visually matched to a source color with high fidelity.

In further accordance with the first embodiment, by computing the point of convergence by linear interpolation of points of convergence corresponding to representative colors adjacent to the source color on the hue scale such that the points of convergence are contiguous to each other, color gamut compression with superior color consistency in the direction of hue is provided. Since only the color gamut for the representative colors may be stored in order to determine the point of convergence for each hue, the color gamut compression according to the first embodiment requires a relatively small storage capacity as compared with an implementation where the color gamut for each hue is stored.

Since an arrangement is provided in the first embodiment to ensure that an achromatic source color is not compressed to a chromatic color, color gradation is not lost and white and black are preserved in the reproduction.

While the description above assumes that the compression takes place in the CIE/L*a*b* color space in the first embodiment, compression may alternatively take place in other types of color space such as the RGB color space, the CIE/L*u*v* color space and the CIE/XYZ color space.

In an alternative configuration, the point of convergence computation part of the first embodiment may compute the point of convergence such that it has the same hue value as a hypothetical color that would be reproduced by the information-output apparatus based on an input digital signal value corresponding to the source color, has the same brightness as one of a mean value (described later), gravitational center value (described later) and median (described later) of the color gamut reproducible by the information-output apparatus, lies inside the color gamut of the information-output apparatus, and is chromatic.

A mean value of the color gamut is defined as a coordinate determined by providing a predetermined number of sample points in a color space reproducible by an information-output apparatus and dividing a sum of color components at the sample points by the number of sample points. A gravitation center value of the color gamut is defined as a coordinate determined by providing a predetermined number of sample points in a color space reproducible by an information-output apparatus and dividing a weighted sum of color components at the sample points by the number of sample points. A median of the color gamut is defined as a median of color components on each axis of a color space reproducible by an information-output apparatus.

In the first embodiment, it is assumed that the point of compression computation part computes the coordinate of a point of compression such that the point of compression lies at an intersection between a substantially straight line connecting a point of convergence and a point corresponding to the source color, and a boundary of the color gamut of the information-output apparatus. When the point of compression is computed using approximate color space coordinates, the point of compression may be closest to the point of intersection. Alternatively, the point of compression may be computed by subjecting a plurality of points close to the point if intersection to weighted computation.

Embodiment 2

In the first embodiment, the point of convergence is computed such that it corresponds to a chromatic color which has the same hue value as a hypothetical color reproduced by an information-output apparatus based on a digital signal value corresponding to a source color provided by a color image signal, and which lies inside the color gamut of the information-output apparatus. In the second embodiment, however, the point of convergence is configured to lie on a line segment.

Figure 3:
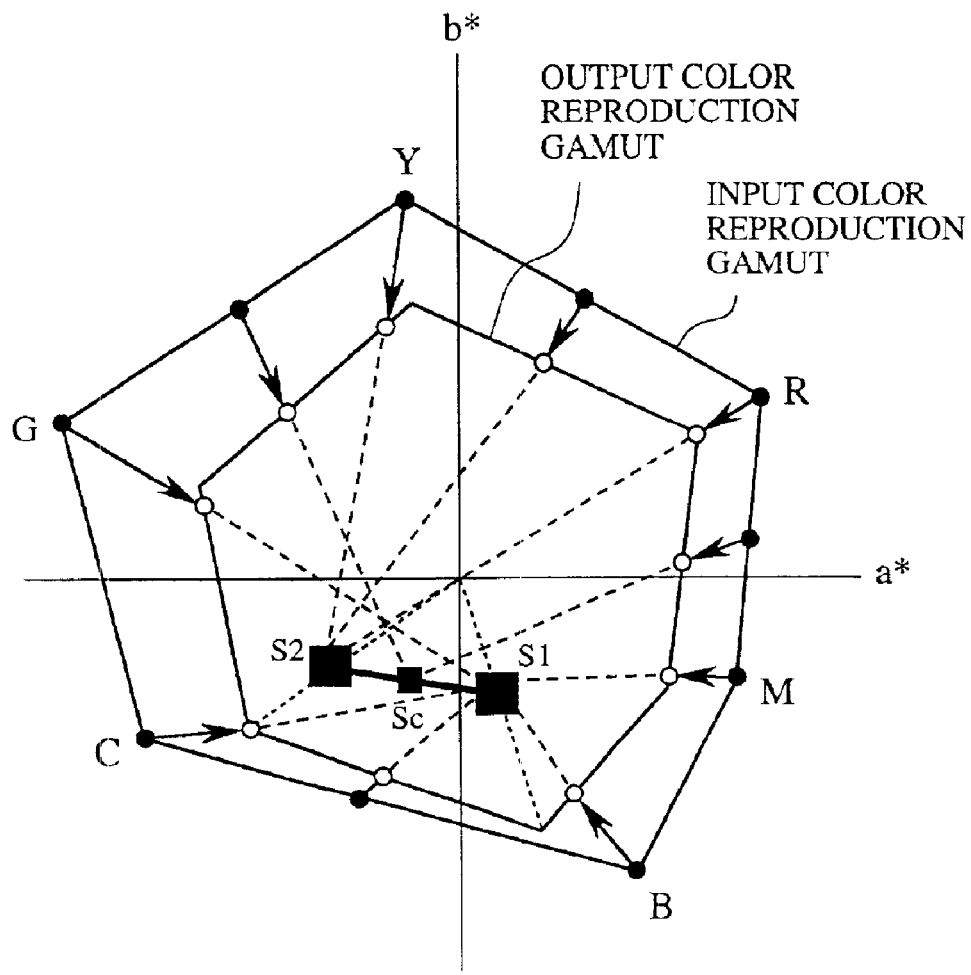
FIG. 3 is a chart illustrating color gamut compression according to the second embodiment.

FIG. 3 is a chart illustrating color gamut compression according to the second embodiment. Referring to FIG. 3, S1 indicates a color having the same hue value as a color reproduced by the information-output apparatus 22 responsive to the representative color B. For example, the color S1 may have the same brightness level as the maximum chroma color at the hue value. S2 indicates a color having the same hue value as a color reproduced by the information-output apparatus 22 responsive to the representative color C. For example, the color S2 may have the same brightness level as the maximum chroma color at the hue value.

When the hue of the source color provided by the color image signal from the point of convergence computation execution determination part 102 lies within a hue range including transitions from the representative color G of the information-input apparatus 21 to the representative colors C, B and M, the point S1 is used as the point of convergence. When the hue of the source color lies within a hue range including transition from the representative color R to the representative color Y, the point S2 is used as the point of convergence. When the hue of the source color lies within a hue range including transition from the representative color M to the representative color R, the point $S_c$ determined by linear interpolation on the line segment between S1 and S2 according to the equation (2) below is used as the point of convergence. When the hue of the source color lies within a hue range including transitions from the representative color Y to the representative color G, the point $S_c$ determined by linear interpolation on the line segment between S1 and S2 according to the equation (3) below is used as the point of convergence.

$$S_{vc}=k*S_v2+(1-k)*S_v1 \quad (2)$$

$$k = \frac{|H_C - H_M|}{|H_R - H_M|}$$

$$S_{vc}=k*S_v1+(1-k)*S_v2 \quad (3)$$

$$k = \frac{|H_Y - H_C|}{|H_Y - H_G|}$$

In the equations (2) and (3), $S_v1$ and $S_v2$ denote position vectors at end points S1 and S2, respectively, comprising the line segment S1-S2. $S_{vc}$ denotes a position vector at the point of convergence $S_c$. $H_c$ denotes the hue of the source color C to be compressed; $H_l$ denotes the hue of the representative color M of the information-input apparatus 21; $H_R$ denotes the hue of the representative color R of the information-input apparatus 21; $H_Y$ denotes the hue of the representative color Y of the information-input apparatus 21; and $H_G$ denotes the hue of the representative color G of the information-input apparatus 21.

As described above, according to the color gamut compression of the second embodiment, when the hue of the source color provided by the color image signal lies within a hue range including transitions from the representative color G of the information-input apparatus to the representative colors C, B and M, the point S1 having the same hue as a color reproduced by the information-output apparatus responsive to the representative color B is used as the point of convergence. Since compression occurs in the direction of the representative color B within the hue range including transitions from the representative color G to the representative colors C, B and M, color gamut compression providing high-fidelity visual matching results.

When the hue of the source color lies within a hue range including transition from the representative color B to the representative color Y, the point S2 having the same hue as a color reproduced by the information-output apparatus responsive to the representative color C is used as the point of convergence. Since compression occurs in the direction of the representative color C in the hue range including transition from the representative color R to the representative color Y, color gamut compression providing high-fidelity visual matching results.

When the hue of the source color lies within a hue range including transition from the representative color M to the representative color R, the point $S_c$ determined by linear interpolation with respect to hue on the line segment between S1 and S2 according to the equation (2) is used as the point of convergence. Since compression occurs in the direction of the representative color B or the representative color C within the hue range including transition from the representative color M to the representative color R, color gamut compression providing high-fidelity visual matching results.

When the hue of the source color lies within a hue range including transition from the representative color Y to the representative color G, the point $S_c$ determined by linear interpolation with respect to hue on the line segment between S1 and S2 according to the equation (3) is used as the point of convergence. Since compression occurs in the direction of the representative color B or the representative color C in the hue range including transition from the representative color Y to the representative color G, color gamut compression providing high-fidelity visual matching results.

By eliminating the need for computation of the point of convergence for every hue value and fixing the point of convergence within each of a small number of predetermined hue ranges, the frequency of computation is limited to the number of hue ranges. Accordingly, computation of the point of convergence is facilitated and the processing rate is increased.

Embodiment 3

In the foregoing embodiments, a point of convergence is computed for a chromatic color inside the color gamut of the information-output apparatus is given. A description will now be given of computation of the point of convergence using a parameter of chroma.

Figure 4:
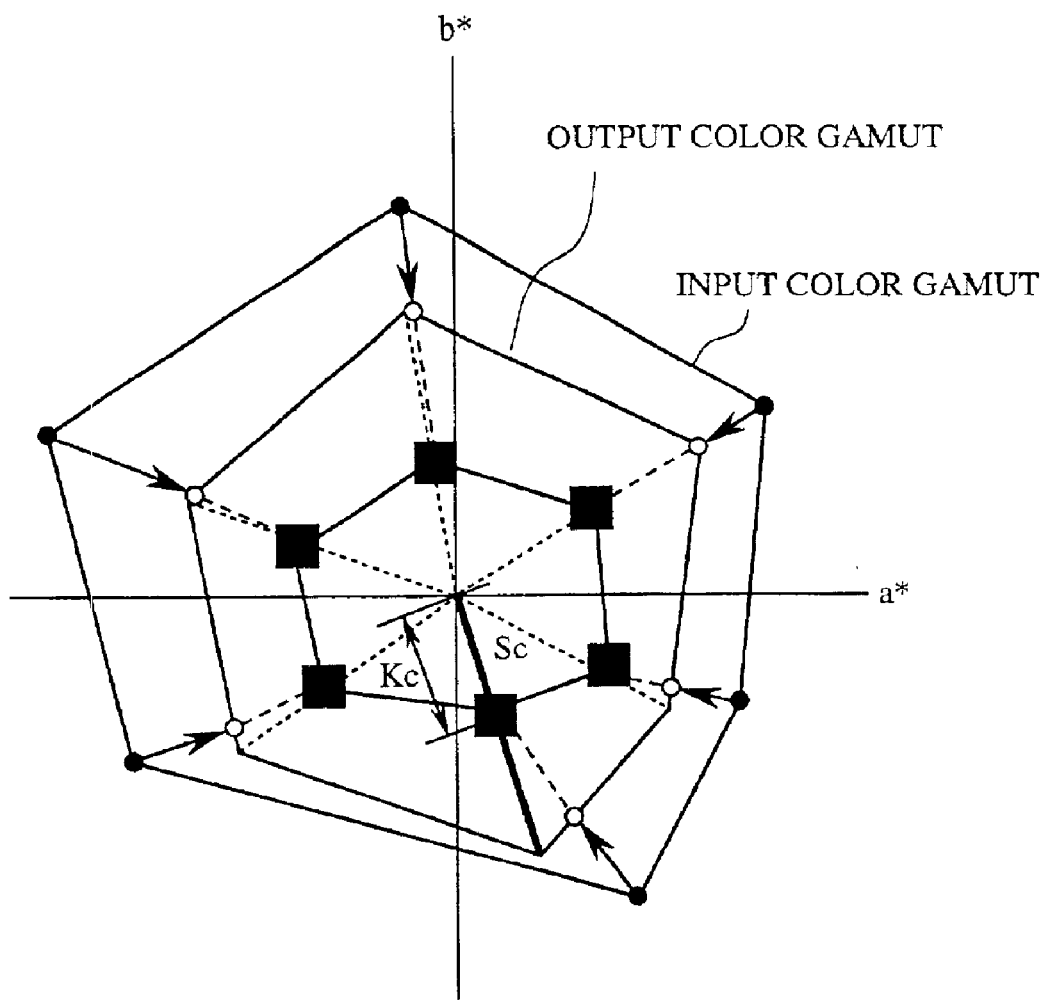
FIG. 4 is a chart illustrating color gamut compression according to the third embodiment.

FIG. 4 is a chart illustrating color gamut compression according to the third embodiment. Referring to FIG. 4, $S_c$ indicates a point of convergence computed using a parameter $K_c$ ($0<K_c<1$), where 0 indicates an achromatic color and 1 indicates a maximum chroma color, such that the color at the point of convergence $S_c$ has the same brightness level as the maximum chroma color at a given hue value.

In the third embodiment the point of convergence computation part 103 computes a point of convergence such that it corresponds to a chromatic color which has the same brightness level as the maximum chroma color reproducible by the information-output apparatus 22 for the hue value determined by the source color provided by the color image signal from the point of convergence computation determination part 102, and lies inside the color gamut of the information-output apparatus 22, and such that chroma level of the color at the point of convergence satisfies the equation (1). It is assumed here that the hue value determined by the source color provided by the color image signal is the same as the hue value of a reproduction color produced by the information-output apparatus 22 from the digital signal value generated by the information-input apparatus 21 for the source color.

$$C_n = K_c \times C_{max} \quad (1)$$

In the equation (1), $C_n$ indicates chroma at the point of convergence and $C_{max}$ indicates maximum chroma reproducible by the information-output apparatus 22 at the same hue value as a reproduction color produced by the information-output apparatus 22 from the digital signal value generated by the information-input apparatus 21 for source color provided by the color image signal.

For example, when high-chroma output is required, the parameter $K_c$ may be set such that $0.5 < K_c < 1$. When low-chroma image is preferable, $K_c$ may be set such that $0 < K_c < 0.5$, thus providing low-chroma image not only for high-brightness and low-brightness but also for halftone. Thus, merely by changing the parameter $K_c$, it is possible to control chroma of the output image easily.

An alternative to the point of convergence computation according to the third embodiment will now be described. For example, the point of convergence may have the same brightness level as the mean value of the color gamut of the information-output apparatus for the hue value of the source color provided by the color image signal from the information-input apparatus. In this case, $C_{max}$ is a maximum chroma value at the mean value of the color gamut of the information-output apparatus for the hue value of the source color provided by the color image signal from the information-input apparatus. The point of convergence may alternative have the same brightness level as the gravitational center value of the color gamut of the information-output apparatus for the hue value of the source color provided by the color image signal from the information-input apparatus. In this case, $C_{max}$ is a maximum chroma value at the gravitational center value of the color gamut of the information-output apparatus for the hue value of the source color provided by the color image signal from the information-input apparatus. The point of convergence may alternatively have the same brightness level as the median of the color gamut of the information-output apparatus for the hue value of the source color provided by the color image signal from the information-input apparatus. In this case, $C_{max}$ is a maximum chroma value at the median of the color gamut of the information-output apparatus for the hue value of the source color provided by the color image signal from the information-input apparatus. In any of these alternative approaches, the same advantage is provided.

In the above description of the third embodiment, it is assumed that the hue value determined by the source color provided by the color image signal has the same hue value as the reproduction color produced by the information-output apparatus from the digital signal value corresponding to the source color. However, when the hue of the source color provided by the color image signal lies within a hue range including transitions from the representative color G of the information-input apparatus to the representative colors C, B and M, the point S1 having the same hue value as the reproduction color produced by the information-output apparatus responsive to the representative color B may be used as the point of convergence, as in the second embodiment. In this case, the hue value determined by the source color may be identical to that of the representative color B of the information-output apparatus. When the hue of the source color lies within a hue range including transition from the representative color R of the information-input apparatus to the representative color Y, the point S2 having the same hue value as the reproduction color produced by the information-output apparatus responsive to the representative color C may be used as the point of convergence, as in the second embodiment. In this case, the hue value determined by the source color may be identical to that of the representative color C of the information-output apparatus.

Embodiment 4

In the foregoing embodiments, a single point of convergence is determined for each hue value. An alternative point of convergence determination based on the single point of convergence and providing a plurality of optional points of convergence in the direction of brightness will now be described.

Figure 5:
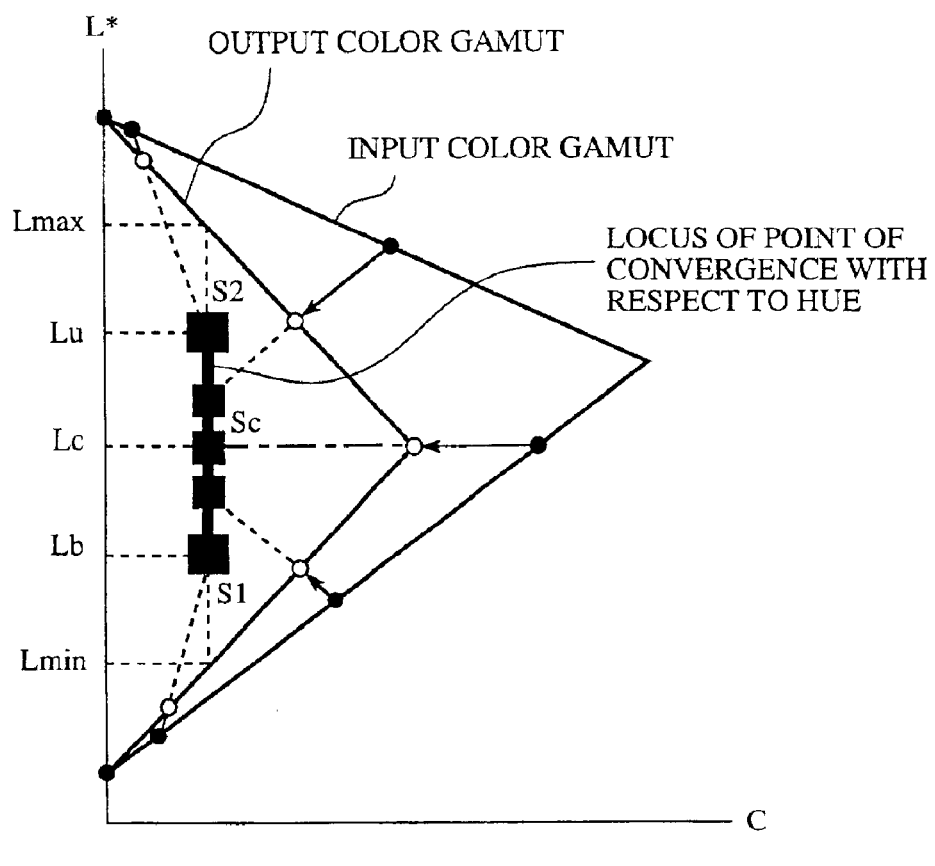
FIG. 5 is a chart illustrating color gamut compression according to the fourth embodiment.

FIG. 5 is a chart illustrating color gamut compression according to the fourth embodiment. Referring to FIG. 5, Sc indicates a reference point of convergence computed according to the second embodiment; S1 and S2 indicate points of intersection between a line connecting points of the same hue value and same chroma value as the reference point of convergence Sc and parallel with the brightness axis, and the boundary of the color gamut of the information-output apparatus, where S1 indicates a point of minimum brightness and S2 indicates a point of maximum brightness.

According to the fourth embodiment, the point of convergence computation part 103 computes additional points of convergence between S1 and S2 determined in accordance with chroma of the source color provided by the color image signal.

The point of convergence computation part 103 first computes the coordinates of the point S3 and S4 based on the point of convergence Sc. The point of convergence computation part 103 then computes the maximum brightness $L_u$ and minimum brightness $L_b$ at the respective points of convergence according to the equations (4) below. When the source color provided by the color image signal has a higher brightness than the reference point of convergence $S_c$ (i.e., when the brightness is higher than $L_c$), the point of convergence is determined by shifting the point S2 toward $S_c$ by a distance proportional to chroma of the source color. When the source color provided by the color image signal has a lower brightness than the reference point of convergence $S_c$ (i.e, when the brightness is lower than $L_c$), the point of convergence is determined by shifting the point $S_c$ toward S1 by a distance proportional to chroma of the source color.

$$\text{if higher than } L_c, L_u = (L_{max} - L_c) \times K1 + L_c$$
$$\text{if lower than } L_c, L_b = (L_{min} - L_c) \times K1 + L_c \quad (4)$$

In the equation (4), $L_u$ indicates maximum brightness of the point of convergence; $L_b$ indicates minimum brightness of the point of convergence; $L_{max}$ and $L_{min}$ indicate brightness of two points S1 and S2, respectively; $L_c$ indicates brightness of the reference point of convergence $S_c$; and K1 indicates a parameter ($0 < K1 < 1$).

As described above, according to the color gamut compression of the fourth embodiment, brightness of the point of convergence is varied in accordance with chroma of the source color provided by the color Image signal. Therefore, precision in visual matching with respect to hue is increased. In the high-brightness area and low-brightness area, the fourth embodiment provides more precise image reproduction than the foregoing embodiments.

While the points S1 and S2 are defined as points of intersection between a line connecting points of the same hue value, same chroma as the reference point of convergence Sc and parallel with the brightness axis, and the boundary of the color gamut of the information-output apparatus, S1 and S2 could be points closest to the two points of intersection when an approximate color space is used. Alternatively, S3 and S4 could be points determined by weighted computation on a plurality of points close to the two points of intersection.

Figure 6:
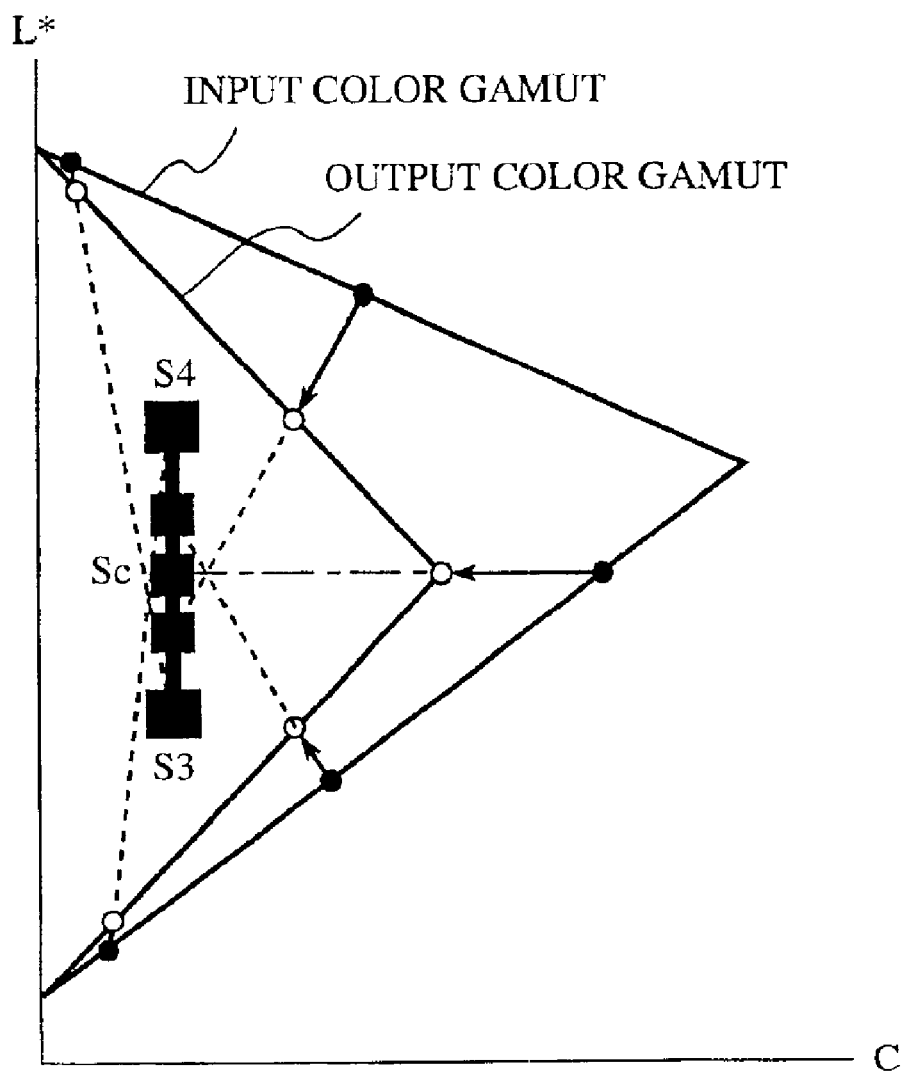
FIG. 6 is a chart illustrating color gamut compression according to a variation of the fourth embodiment.

FIG. 6 shows a variation of the color gamut compression according to the fourth embodiment. As shown in FIG. 6, when the source color provided by the color image signal has a higher brightness than the reference point of convergence $S_c$, the point of convergence may be determined by shifting the point S3 toward $S_c$ by a distance proportional to chroma of the source color. When the source color provided by the color image signal has a lower brightness than the point of convergence $S_c$, the point of convergence may be determined by shifting the point $S_c$ toward S4 by a distance proportional to chroma of the source color. With this, high-chroma images are provided not only in the high-brightness area and low-brightness area but also in the intermediate zone.

Embodiment 5

In the fourth embodiment, a plurality of optional points of convergence are provided in the direction of brightness for each hue value. A A description will now be given of the fifth embodiment where a plurality of optional points of convergence are provided in the direction of chroma.

Figure 7:
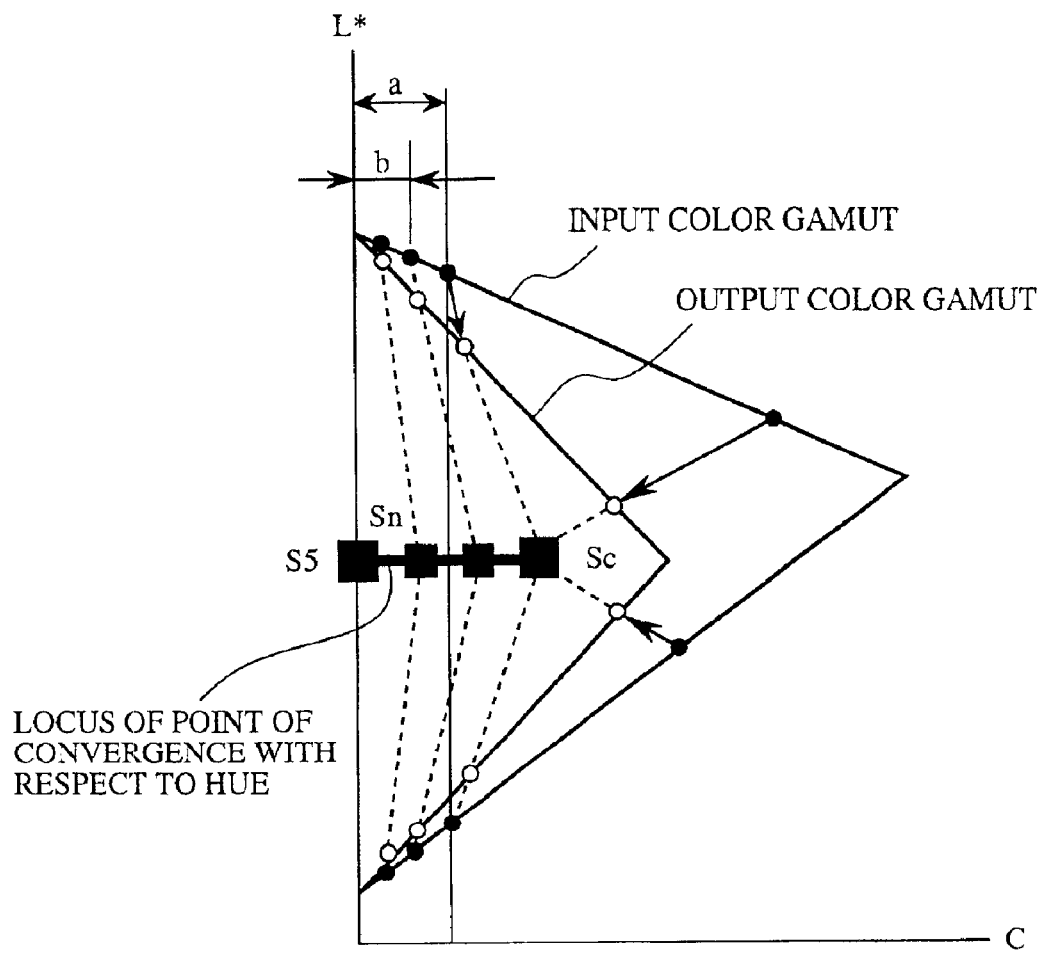
FIG. 7 is a chart illustrating color gamut compression according to the fifth embodiment.
Figure 8:
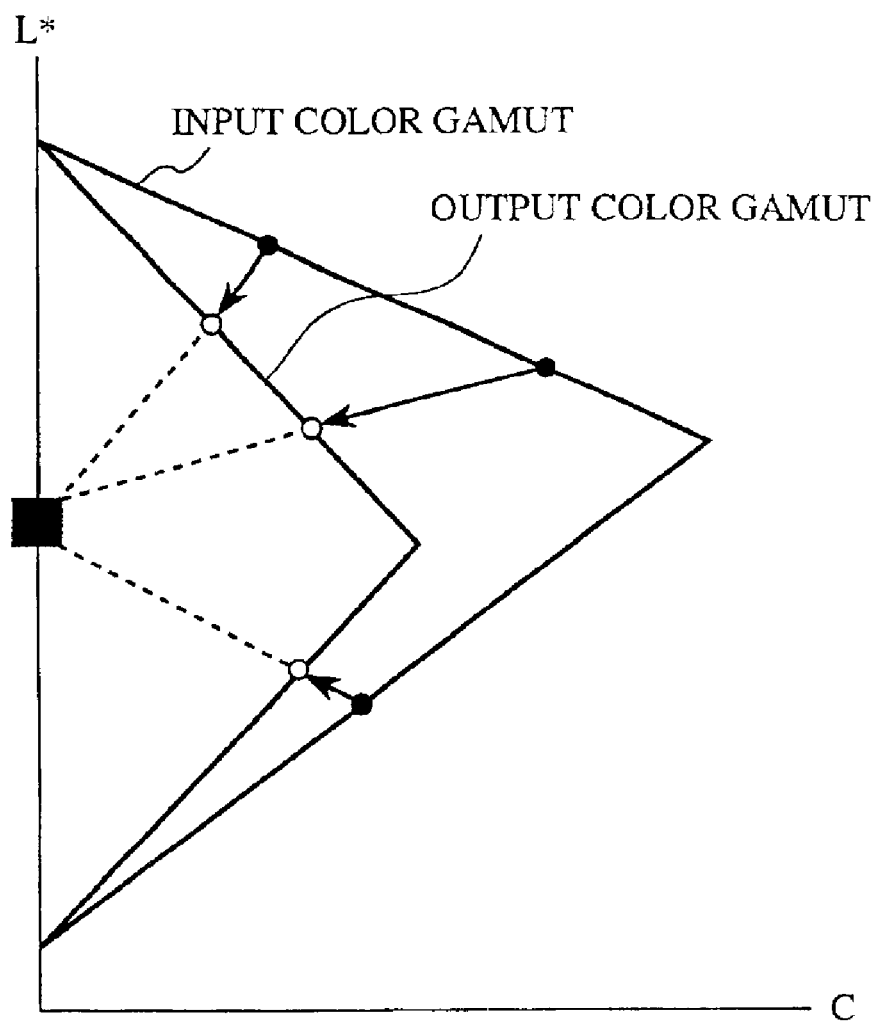
FIG. 8 is a chart illustrating color gamut compression according to the related art.

FIG. 7 is a chart illustrating color gamut compression according to the fifth embodiment. Referring to FIG. 7, $S_c$ indicates a reference point of convergence computed according to the second embodiment; S5 indicates a point corresponding to an achromatic color which has the same brightness as the reference point of convergence $S_c$; a indicates an arbitrary chroma value computed as a distance from the achromatic axis according to the equation (5) below, where $C_c$ indicates chroma at the reference point of convergence $S_c$.

$$C_c * 1/4 < a < C_c * 1/2 \qquad (5)$$

In the fifth embodiment, the point of convergence computation part 103 compares the chroma value of the source color provided by the color image signal from the information-input apparatus at a given hue, with a. If the chroma value is equal to or greater than a, the reference point of convergence $S_c$ is determined to be the point of convergence. If the chroma value is smaller than a, the point of convergence computation part 103 computes the point of convergence $S_n$ as a point between S5 and $S_c$ determined by the chroma value of the source color.

For example, when the source color has a chroma value b which is smaller than a, the point of convergence computation part 103 computes the point of convergence $S_n$ so that the equation (6) below is satisfied. That is, when the chroma is smaller than a, the chroma value of the target point of convergence is removed by a distance commensurate with the chroma value of the out-of-the-gamut chromatic source color, toward the achromatic axis, while maintaining the brightness of the reference point of convergence $S_c$.

$$C_{an} = b/a * S_c S5 \qquad (6)$$

It is to be appreciated that, according to the color gamut compression of the fifth embodiment, by computing the point of convergence $S_n$ as a point between S5 and $S_c$ determined by the chroma value of the source color, the chroma value of the point of convergence is varied in accordance with the chroma value of the source color provided by the color image signal. Thus, color consistency of the image output by the information-output apparatus is ensured.

By providing the point of convergence at the reference point of convergence $S_c$ when the chroma value is equal to or greater than the arbitrary chroma value a, and by computing a target point of convergence as a point between S5 and $S_c$ determined by the chroma value of the source color, color consistency in the neighborhood of white and black is properly ensured.

Embodiment 6

In the first embodiment, the point of convergence computation part 103 computes a point of convergence such that it has the same hue value as a hypothetical chromatic color that would be reproduced by the information-output apparatus 22 based on a digital signal value for a color determined by the source color and lies inside the color gamut of the information-output apparatus 22. In the sixth embodiment, the point of convergence computation part 103 computes a point of convergence based on the color image signal from the point of convergence computation execution part 102 such that the point of convergence has the same hue value as the source color in the CIE/L*a*b* color space, has the same brightness level as the maximum chroma color reproducible by the information-output apparatus 22 for the hue value, lies inside the color gamut of the information-output apparatus 22 and corresponds to a chromatic color. The point of convergence computation part 103 outputs the coordinate of the point of convergence thus computed and the color image signal to the first point of compression computation part 104.

Figure 9:
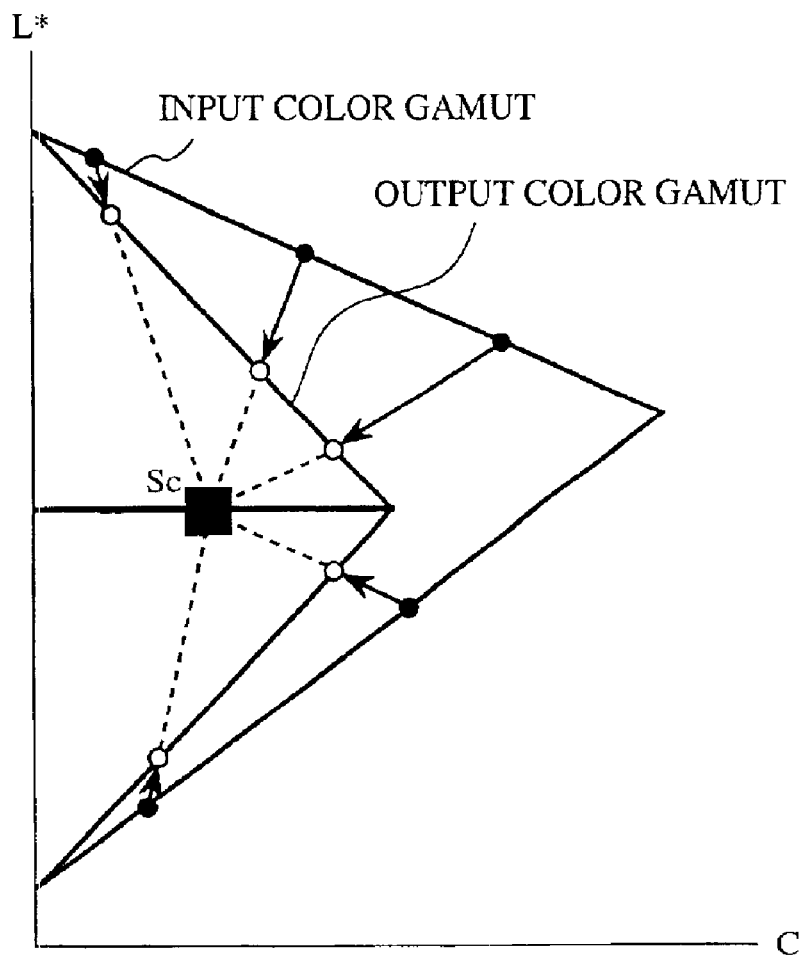
FIG. 9 is a chart illustrating color gamut compression according to the sixth embodiment.

FIG. 9 is a chart illustrating color gamut compression according to the sixth embodiment and showing a L*-C plane for the hue value that is the same as the source color provided by the color image signal. Referring to FIG. 9, $S_c$ indicates a point of convergence computed by the point of convergence computation part 103.

As shown in FIG. 9, the first point of compression computation part 104 according to the sixth embodiment computes, based on the color image signal from the point of convergence computation part 103, a point of compression that lies at a point of intersection between the substantially straight line connecting the point of convergence $S_c$ and the point corresponding to the source color, and the boundary of the color gamut of the information-output apparatus 22. The first point of compression computation part 104 outputs the coordinate of the point of compression thus computed to the compression part 106. Accordingly, a source color out of the gamut of the information-output apparatus and lying in the high-brightness area or low-brightness area can be compressed to a target color with high chroma. Of course, variations described with reference to the first embodiment are also possible in the sixth embodiment.

Embodiment 7

In the sixth embodiment, the point of convergence is computed as that of a chromatic color which has the same hue value a the source color provided by the color image signal generated by the information-input apparatus, has the same brightness as the maximum-chroma color reproducible by the information-output apparatus for the hue value, and lies inside the color gamut of the information-output apparatus. A description will now be given of computation of the point of convergence using a parameter of chroma.

Figure 10:
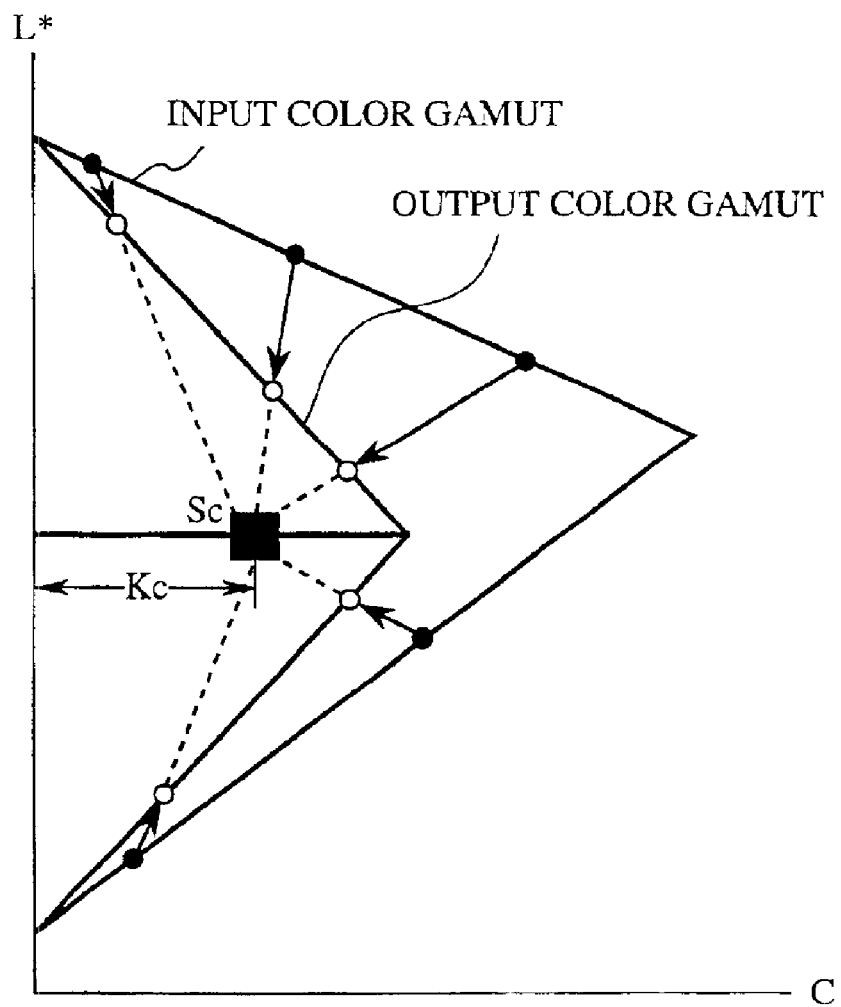
FIG. 10 is a chart illustrating color gamut compression according to the seventh embodiment.

FIG. 10 is a chart illustrating color gamut compression according to the seventh embodiment. Referring to FIG. 10, $S_c$ indicates a point of convergence computed using a parameter $K_c$ indicating a distance from the achromatic axis ($0<K_c<1$), where 0 indicates an achromatic color and 1 indicates a maximum chroma color such that the color at the point of convergence $S_c$ has the same brightness level as the maximum chroma color reproducible by the information-output apparatus at a given hue value.

In the seventh embodiment the point of convergence computation part 103 computes a point of convergence such that it corresponds to a chromatic color that has the same hue value as the source color provided by the color image signal, has the same brightness level as the maximum chroma color reproducible by the information-output apparatus 22 for the hue value, and lies inside the color gamut of the information-output apparatus 22, such that chroma of the color at the point of convergence satisfies the equation (1), and such that the points of convergence are contiguous to each other.

$$C_n = K_c \times C_{max} \qquad (1)$$

In the equation (1), $C_n$ indicates chroma at the point of convergence and $C_{max}$ indicates maximum chroma reproducible by the information-output apparatus 22 at the same hue value as the source color provided by the color image signal.

For example, when high-chroma output is required, the parameter $K_c$ may be set such that $0.5<K_c<1$. When low-chroma image is preferable, $K_c$ may be set such that $0<K_c<0.5$, thus providing low-chroma image not only for high-brightness and low-brightness but also for halftone. Thus, merely by changing the parameter $K_c$, it is possible to control chroma of the output image easily.

An alternative to the point of convergence computation according to the seventh embodiment will now be described. For example, the point of convergence may have the same brightness level as the mean value of the color gamut of the information-output apparatus for the hue value of the source color. In this case, $C_{max}$ is a maximum chroma value at the mean value of the color gamut of the information-output apparatus for the hue value of the source color. The point of convergence may alternative have the same brightness level as the gravitational center value of the color gamut of the information-output apparatus for the hue value of the source color. In this case, $C_{max}$ is a maximum chroma value at the gravitational center value of the color gamut of the information-output apparatus for the hue value of the source color. The point of convergence may alternatively have the same brightness level as the median of the color gamut of the information-output apparatus for the hue value of the source color. In this case, $C_{max}$ is a maximum chroma value at the median of the color gamut of the information-output apparatus for the hue value of the source color. In any of these alternative approaches, the same advantage is provided.

Embodiment 8

In the sixth and seventh embodiments, a single point of convergence is determined for each hue value. In alternative approach, a point of convergence is determined based on the reference single point of convergence so as to provide a plurality of optional points of convergence in the direction of brightness. The detail of this approach has already been given with reference to the fourth embodiment, and the description thereof is omitted.

Embodiment 9

In the eighth embodiment, a plurality of optional points of convergence are provided in the direction of brightness for each hue value. In an alternative approach, a plurality of optional points of convergence may be provided in the direction of chroma. The detail of this approach has already been given with reference to the fifth embodiment, and the description thereof is omitted.

The present invention is not limited to the above-described embodiments, and variations and modifications may be made without departing from the scope of the present invention.

What is claimed is:

1. A color gamut compression apparatus for converting a source color generated by an information-input apparatus into a target color inside a color gamut reproducible by an information-output apparatus, comprising:

a point of convergence computation part for computing a point of convergence for a chromatic color such that the point of convergence has the same hue value as a hypothetical chromatic color that would be reproduced by the information-output apparatus based on a digital signal value for the information-input apparatus corresponding to a color determined by the source color, and lies inside the color gamut of the information output apparatus;

a first point of compression computation part for computing a point of compression such that the point of compression lies on a substantially straight line connecting the point of convergence and the source color, and lies inside the color gamut of the information-output apparatus; and a compression part for converting the source color into the target color corresponding to the point of compression computed by said first point of compression computation part.

2. The color gamut compression apparatus according to claim 1, wherein said first point of compression computation part computes the point of compression such that the point of compression is at an intersection of the substantially straight line and a boundary of the color gamut of information-output apparatus.

3. The color gamut compression apparatus according to claim 1, further comprising:

a point of convergence computation execution determination part for determining whether the source is a chromatic color or an achromatic color; and a second point of compression computation part for computing, when said point of convergence computation execution determination part determines that the source color is an achromatic color, the point of compression such that the point of compression lies inside the color gamut of the information-output apparatus and has zero chroma, wherein said compression part converts the source color into a color corresponding to the point of compression computed by said second point of compression computation part.

4. The color gamut compression apparatus according to claim 1, wherein, when a hue value of the source color matches that of any of a predetermined number of representative colors of the information-input apparatus, said point of convergence computation part computes the point of convergence such that the point of convergence has the same hue value as a hypothetical color reproduced by the information-output apparatus based on a digital signal value corresponding to the matched representative color, lies inside the color gamut of the information-output apparatus and is achromatic, and wherein, when the source color is intermediate adjacent representative colors with respect to hue, the point of convergence is computed by linear interpolation of points of convergence corresponding to the adjacent representative colors.

5. The color gamut compression apparatus according to claim 1, wherein, when the hue of the source color lies within a hue range including transitions from a representative color Green to representative colors Cyan, Blue and Magenta, said point of convergence computation part computes the point of convergence such that the point of convergence has the same hue value as a hypothetical color reproduced by the information output apparatus based on a digital signal value corresponding to the representative color Blue, lies inside the color gamut of the information output apparatus, and is chromatic.

6. The color gamut compression apparatus according to claim 1, wherein, when the hue of the source color lies within a hue range including a transition from a representative color Red to a representative color Yellow, said point of convergence computation part computes the point of convergence such that the point of convergence has the same hue value as a hypothetical color reproduced by the information-output apparatus based on a digital signal value corresponding to the representative color Cyan, lies inside the color gamut of the information-output apparatus, and is chromatic.

7. The color gamut compression apparatus according to claim 1, wherein, when the hue of the source color lies within a hue range including a transition from a representative color Magenta to a representative color Red, said point of convergence computation part computes a first point of convergence such that the first point of convergence has the same hue value as a hypothetical color reproduced by the information-output apparatus based on a digital signal value corresponding to the representative color Blue, lies inside the color gamut of the information-output apparatus, and is chromatic, and said point of convergence computation part computes a second point of convergence such that the second point of convergence has the same hue value as a hypothetical color reproduced by the information-output apparatus based on a digital signal value corresponding to a representative color Cyan, lies inside the color gamut of the information-output apparatus, and is chromatic, and wherein the point of convergence is determined by linear interpolation on a hue scale on a line segment between the first point of convergence and the second point of convergence.

8. The color gamut compression apparatus according to claim 1, wherein, when the hue of the source color lies within a hue range including a transition from a representative color Yellow to a representative color Green, said point of convergence computation part computes a first point of convergence such that the first point of convergence has the same hue value as a hypothetical color reproduced by the information-output apparatus based on a digital signal value corresponding to the representative color Blue, lies inside the color gamut of the information output apparatus, and is chromatic, and said point of convergence computation part computes a second point of convergence such that the second point of convergence has the same hue value as a hypothetical color reproduced by the information-output apparatus based on a digital signal value corresponding to a representative color Cyan, lies inside the color gamut of the information-output apparatus, and is chromatic, and wherein the point of convergence is determined by linear interpolation on a hue scale on a line segment between the first point of convergence and the second point of convergence.

9. The color gamut compression apparatus according to claim 1, wherein said point of convergence computation part computes the point of convergence such that the point of convergence has the same brightness level as one of four values for the hue value which is determined by the source color, the four values being maximum chroma, mean value of the color gamut, gravitational center value of the color gamut, and median of the color gamut.

10. The color gamut compression apparatus according to 9, wherein said point of convergence computation part computes the point of convergence such that the point of convergence has a hue value Cn satisfying an equation (1) below $$C_n = K_c \times C_{max} \qquad (1)$$

where $C_{max}$ indicates one of maximum chroma reproducible by the information-output apparatus for the hue determined by the source color, maximum chroma at the mean value of the color gamut, maximum chroma at the gravitational center value of the color gamut, and maximum chroma at the median of the color gamut, and $k_c$ ($0 < k_c < 1$) 5 indicates an arbitrary parameter.

11. The color gamut compression apparatus according to claim 1, wherein said point of convergence computation part computes an optional point of computation such that the optional point of convergence lies between two intersections formed by a line having the same hue value and same chroma as the point of convergence determined according to claim 1 and parallel with a brightness axis and by a boundary of the color gamut of the information-output apparatus, and is determined in accordance with a chroma value of the source color.

12. The color gamut compression apparatus according to claim 11, wherein said point of compression computation part computes an optional point of convergence such that the optional point of convergence lies between the point of convergence determined and an achromatic point having the same hue value and same brightness level as the point of convergence determined, and is determined in accordance with a chroma value of the source color.

13. The color gamut compression apparatus according to claim 1, wherein said point of convergence computation part compares a chroma value of the source color with a predetermined chroma value a, and, if the chroma value is equal to or greater than a, the point of convergence determined according to claim 1 is used, and, if the chroma value is smaller than a, said point of convergence computation part computes an optional point of convergence such that the optional point of convergence lies between the point of convergence determined according to claim 1 and an achromatic point having the same hue value and same brightness level as the point of convergence determined according to claim 1, and is determined by the chroma value of the source color.

14. A color gamut compression method for converting a source color generated by an information-input apparatus into a target color inside a color gamut reproducible by an information-output apparatus, comprising the steps of:

computing a point of convergence for a chromatic color such that the point of convergence has the same hue value as a hypothetical chromatic color that would be reproduced by the information-output apparatus based on a digital signal value for the information-input apparatus corresponding to a color determined by the source color, and lies inside the color gamut of the information-output apparatus;

computing a point of compression such that the point of compression lies on a substantially straight line connecting the point of convergence and the source color, and lies inside the color gamut of the information-output apparatus; and converting the source color into the target color corresponding to the point of compression computed according to the step of computing the first point of compression.

15. The color gamut compression method according to claim 14, further comprising the steps of:

determining whether the source is a chromatic color or an achromatic color; and computing, when the source color is determined to be an achromatic color, the point of compression such that the point of compression lies inside the color gamut of the information output apparatus and has zero chroma, wherein the source color is converted into a color corresponding to the point of compression thus computed.

16. The color gamut compression method according to claim 14, wherein, when a hue value of the source color matches that of any of a predetermined number of representative colors of the information-input apparatus, the step of computing the point of convergence computes the point of convergence such that the point of convergence has the same hue value as a hypothetical color reproduced by the information-output apparatus based on a digital signal value corresponding to the matched representative color, lies inside the color gamut of the information-output apparatus, and is achromatic; and wherein, when the source color is intermediate adjacent representative colors with respect to hue, the point of convergence is computed by linear interpolation of points of convergence corresponding to the adjacent representative colors.

17. The color gamut compression method according to claim 14, wherein, when the hue of the source color lies within a hue range including transitions from a representative color Green to representative colors Cyan, Blue and Magenta, the step of computing the point of convergence computes the point of convergence such that the point of convergence has the same hue value as a hypothetical color reproduced by the information-output apparatus based on a digital signal value corresponding to the representative color Blue, lies inside the color gamut of the information-output apparatus, and is chromatic.

18. The color gamut compression method according to claim 14, wherein, when the hue of the source color lies within a hue range including a transition from a representative color Red to a representative color Yellow, the step of computing the point of convergence computes the point of convergence such that the point of convergence has the same hue value as a hypothetical color reproduced by the information-output apparatus based on a digital signal value corresponding to the representative color Cyan, lies inside the color gamut of the information-output apparatus, and is chromatic.

19. The color gamut compression method according to claim 14, wherein, when the hue of the source color lies within a hue range including a transition from a representative color Magenta to a representative color Red, the step of computing the point of convergence computes a first point of convergence such that the first point of convergence has the same hue value as a hypothetical color reproduced by the information-output apparatus based on a digital signal value corresponding to the representative color Blue, lies inside the color gamut of the information-output apparatus, and is chromatic, and the step of computing the point of convergence computes a second point of convergence such that the second point of convergence has the same hue value as a hypothetical color reproduced by the information-output apparatus based on a digital signal value corresponding to a representative color Cyan, lies inside the color gamut of the information-output apparatus, and is chromatic, and wherein the point of convergence is determined by linear interpolation on a hue scale on a line segment between the first point of convergence and the second point of convergence.

20. The color gamut compression method according to claim 14, wherein, when the hue of the source color lies within a hue range including a transition from a representative color Yellow to a representative color Green, the step of computing the point of convergence computes a first point of convergence such that the first point of convergence has the same hue value as a hypothetical color reproduced by the information-output apparatus based on a digital signal value corresponding to the representative color Blue, lies inside the color gamut of the information-output apparatus, and is chromatic, and the step of computing the point of convergence computes a second point of convergence such that the second point of convergence has the same hue value as a hypothetical color reproduced by the information-output apparatus based on a digital signal value corresponding to the representative color Cyan, lies inside the color gamut of the information-output apparatus, and is chromatic, and wherein the point of convergence is determined by linear interpolation on a hue scale on a line segment between the first point of convergence and the second point of convergence.

21. A color gamut compression apparatus for converting a source color generated by an information-input apparatus into a target color inside a color gamut reproducible by an information-output apparatus, comprising:

a point of convergence computation part for computing a point of convergence for a chromatic color such that the point of convergence has the same hue value as the source color, has the same brightness as one of a maximum chroma color, a mean value of the color gamut reproducible by the information-output apparatus, gravitational center value of the color gamut reproducible by the information-output apparatus, and median of the color gamut reproducible by the information-output apparatus, and lies inside the color gamut of the information-output apparatus;

a first point of compression computation part for computing a point of compression such that the point of compression lies on a substantially straight line connecting the point of convergence and the source color, and lies inside the color gamut of the information-output apparatus; and a compression part for converting the source color into the target color corresponding to the point of compression computed by said first point of compression computation part.

22. The color gamut compression apparatus according to claim 21, wherein said first point of compression computation part computes the point of compression such that the point of compression is at an intersection of the substantially straight line and a boundary of the color gamut of information-output apparatus.

23. The color gamut compression apparatus according to claim 21, wherein, when a hue value of the source color matches that of any of a predetermined number of representative colors of the information-input apparatus, said point of convergence computation part computes the point of convergence for a chromatic color such that the point of convergence has the same hue value as the source color, has the same brightness as one of a maximum chroma color, a mean value of the color gamut reproducible by the information-output apparatus, gravitational center value of the color gamut reproducible by the information-output apparatus, and median of the color gamut reproducible by the information-output apparatus, and lies inside the color gamut of the information-output apparatus, and wherein, when the source color is intermediate adjacent representative colors with respect to hue, the point of convergence is computed by linear interpolation of points of convergence corresponding to the adjacent representative colors.

24. The color gamut compression apparatus according to claim 21, further comprising:

a point of convergence computation execution determination part for determining whether the source is a chromatic color or an achromatic color; and a second point of compression computation part for computing, when said point of convergence computation execution determination part determines that the source color is an achromatic color, the point of compression such that the point of compression lies inside the color gamut of the information-output apparatus and has zero chroma, wherein said compression part converts the source color into a color corresponding to the point of compression computed by said second point of compression computation part.

25. The color gamut compression apparatus according to 21, wherein said point of convergence computation part computes the point of convergence such that the point of convergence has 5 a hue value Cn satisfying an equation (1) below $$Cn = Kc \times Cmax \quad (1)$$

where Cmax indicates one of maximum chroma reproducible by the information-output apparatus for the hue value of the source color, maximum chroma at the mean value of the color gamut for the hue value of the source color, maximum chroma at the gravitational center value of the color gamut for the hue value of the source color, and maximum chroma at the median of the color gamut for the hue value of the source color, and $k_c$ ($0<k_c<1$) indicates an arbitrary parameter.

26. The color gamut compression apparatus according to claim 21, wherein said point of convergence computation part computes an optional point of computation such that the optional point of convergence lies between two intersections formed by a line having the same hue value and same chroma as the point of convergence determined and parallel with a brightness axis and by a boundary of the color gamut of the information-output apparatus, and is determined in accordance with a chroma value of the source color.

27. The color gamut compression apparatus according to claim 21, wherein said point of compression computation part computes an optional point of convergence such that the optional point of convergence lies between the point of convergence determined and an achromatic point having the same hue value and same brightness level as the point of convergence determined, and is determined in accordance with a chroma value of the source color.

28. The color gamut compression apparatus according to claim 21, wherein said point of convergence computation part compares a chroma value of the source color with a predetermined chroma value a, and, if the chroma value is equal to or greater than a, the point of convergence determined is used, and, if the chroma value is smaller than said point of convergence computation part computes an optional point of convergence such that the optional point of convergence lies between the point of convergence determined and an achromatic point having the same hue value and same brightness level as the point of convergence determined, and is determined by the chroma value of the source color.

29. A color gamut compression method for converting a source color generated by an information-input apparatus into a target color inside a color gamut reproducible by an information-output apparatus, comprising the steps of:

computing a point of convergence for a chromatic color such that the point of convergence has the same hue value as the source color, has the same brightness as one of a maximum chroma color, a mean value of the color gamut reproducible by the information-output apparatus, gravitational center value of the color gamut reproducible by the information-output apparatus, and median of the color gamut reproducible by the information-output apparatus, and lies inside the color gamut of the information-output apparatus;

computing a point of compression such that the point of compression lies on a substantially straight line connecting the point of convergence and the source color, and lies inside the color gamut of the information-output apparatus; and converting the source color into the target color corresponding to the point of compression computed by said first point of compression computation part.

30. The color gamut compression method according to claim 29, wherein the step of computing the first point of compression computes the point of compression such that the point of compression is at an intersection of the substantially straight line and a boundary of the color gamut of information-output apparatus.

31. The color gamut compression method according to claim 29, wherein, when a hue value of the source color matches that of any of a predetermined number of representative colors of the information-input apparatus, the step of computing the point of convergence computes the point of convergence for a chromatic color such that the point of convergence has the same hue value as the source color, has the same brightness as one of a maximum chroma color, a mean value of the color gamut reproducible by the information-output apparatus, gravitational center value of the color gamut reproducible by the information-output apparatus, and median of the color gamut reproducible by the information-output apparatus, and lies inside the color gamut of the information-output apparatus; and wherein, when the source color is intermediate adjacent representative colors with respect to hue, the point of convergence is computed by linear interpolation of points of convergence corresponding to the adjacent representative colors.

32. The color gamut compression method according to claim 29, further comprising the steps of:

determining whether the source is a chromatic color or an achromatic color; and computing, when the source color is determined to be an achromatic color, the point of compression such that the point of compression lies inside the color gamut of the information-output apparatus and has zero chromes, wherein the source color is converted into a color corresponding to the point of compression thus computed.

33. The color gamut compression method according to 29, wherein the step of computing the point of convergence computes the point of convergence such that the point of convergence has a hue value Cn satisfying an equation (1) below $$C_n = K_c \times C_{max} \quad (1)$$

where $C_{max}$ indicates one of maximum chromes reproducible by the information-output apparatus for the hue value of the source color, maximum chromes at the mean value of the color gamut for the hue value of the source color, maximum chromes at the gravitational center value of the color gamut for the hue value of the source color, and maximum chroma at the median of the color gamut for the hue value of the source color, and $k_c$ ($0<k_c<1$) indicates an arbitrary parameter.

34. The color gamut compression method according to claim 29, wherein the step of computing the point of convergence computes an optional point of computation such that the optional point of convergence lies between two intersections formed by a line having the same hue value and same chroma as the point of convergence determined and parallel with a brightness axis and by a boundary of the color gamut of the information-output apparatus, and is determined in accordance with a chroma value of the source color.

35. The color gamut compression method according to claim 29, wherein said point of compression computation part computes an optional point of convergence such that the optional point of convergence lies between the point of convergence determined and an achromatic point having the same hue value and same brightness level as the point of convergence determined, and is determined in accordance with a chroma value of the source color.

36. The color gamut compression method according to claim 29, wherein said point of convergence computation part compares a chroma value of the source color with a predetermined chroma value a, and, if the chroma value is equal to or greater than a, the point of convergence determined according to claim 29 is used, and, if the chroma value is smaller than said point of convergence computation part computes an optional point of convergence such that the optional point of convergence lies between the point of convergence determined according to claim 29 and an achromatic point having the same hue value and same brightness level as the point of convergence determined according to claim 1, and is determined by the chroma value of the source color.

37. The color gamut compression apparatus according to claim 1, wherein the point of compression lies between the point of convergence and the source color.

38. The color gamut compression method according to claim 14, wherein the point of compression lies between the point of convergence and the source color.

39. The color gamut compression apparatus according to claim 21, wherein the point of compression lies between the point of convergence and the source color.

40. The color gamut compression method according to claim 29, wherein the point of compression lies between the point of convergence and the source color.

* * * * *